United States Patent
Hen et al.

(10) Patent No.: US 12,353,547 B2
(45) Date of Patent: Jul. 8, 2025

(54) ALLOW LIST OF CONTAINER IMAGES BASED ON DEPLOYMENT CONFIGURATION AT A CONTAINER ORCHESTRATION SERVICE

(71) Applicant: MICROSOFT TECHNOLOGY LICENSING, LLC, Redmond, WA (US)

(72) Inventors: Idan Hen, Tel-Aviv (IL); Eran Goldstein, Herzliya (IL); Dotan Patrich, Kfar Saba (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 258 days.

(21) Appl. No.: 17/807,234

(22) Filed: Jun. 16, 2022

(65) Prior Publication Data
US 2023/0409710 A1    Dec. 21, 2023

Related U.S. Application Data

(60) Provisional application No. 63/365,360, filed on May 26, 2022.

(51) Int. Cl.
*G06F 21/56* (2013.01)
*G06F 8/61* (2018.01)
*G06F 21/55* (2013.01)

(52) U.S. Cl.
CPC .......... *G06F 21/562* (2013.01); *G06F 8/63* (2013.01); *G06F 21/554* (2013.01); *G06F 2221/033* (2013.01)

(58) Field of Classification Search
CPC ........ G06F 21/562; G06F 8/63; G06F 21/554; G06F 2221/033; G06F 21/56; G06F 21/55
See application file for complete search history.

(56) References Cited

U.S. PATENT DOCUMENTS

2005/0223239 A1*  10/2005  Dotan ............... G06F 21/53
                                                          713/188
2017/0116415 A1*  4/2017   Stopel .............. G06F 21/52
(Continued)

FOREIGN PATENT DOCUMENTS

| CN | 110851351 A | 2/2020 |
| CN | 112084000 A | 12/2020 |
| CN | 112558997 A | 3/2021 |

OTHER PUBLICATIONS

"International Search Report and Written Opinion issued in PCT Application No. PCT/US23/020097", Mailed Date: Aug. 1, 2023, 9 Pages.

*Primary Examiner* — Kaveh Abrishamkar
*Assistant Examiner* — Howard H. Louie
(74) *Attorney, Agent, or Firm* — Workman Nydegger

(57) ABSTRACT

A computing system is configured for detecting anomalies in deployment configurations of container images at a container network. One or more datasets associated with deployment configurations of a container imager are collected, and a plurality of features are extracted based on the one or more datasets for an ID of the container image. A probability score is then generated based on the plurality of features, using a machine-learning model trained on datasets associated with historical deployment configurations of the container image that have been performed via the container orchestration service. The probability score indicates a probability of whether the deployment configurations of the container image are anomalous or not anomalous when compared historical deployment configurations of the container image. An allow list is generated that includes container images and their respective IDs that have a majority of their deployment configurations that are not anomalous.

15 Claims, 10 Drawing Sheets

(56) References Cited

U.S. PATENT DOCUMENTS

| | | | |
|---|---|---|---|
| 2018/0234443 A1* | 8/2018 | Wolkov | H04L 67/535 |
| 2018/0260574 A1* | 9/2018 | Morello | G06F 9/44505 |
| 2019/0190771 A1* | 6/2019 | Fang | H04L 41/40 |
| 2019/0243972 A1* | 8/2019 | Krylov | G06N 20/00 |
| 2020/0250477 A1* | 8/2020 | Barthur | G06F 11/0793 |

* cited by examiner

ALLOW LIST OF CONTAINER IMAGES BASED ON DEPLOYMENT CONFIGURATION AT A CONTAINER ORCHESTRATION SERVICE

CROSS-REFERENCE TO RELATED CASES

The present application claims priority from U.S. Provisional Patent Application Ser. No. 63/365,360, filed May 26, 2022, the disclosure of which is hereby incorporated by reference herein in its entirety.

BACKGROUND

A container orchestration service, such as Kubernetes®, is a service that automates deploying, running, and scaling applications running in many containers on top of many machines. For example, the container orchestration service is configured to schedule a particular container to run on a particular machine, and the container orchestration service is also configured to monitor the status of the containers, as well as scaling the deployed application.

Users deploy applications by pulling a container image from a registry. A registry is a repository containing container images that can be deployed to a containers cluster. A registry can be either private or public. While public registries are simple to use, private registries are more secure, allowing role-based access control and gate which images get pushed to the repository. As a rule of thumb, users should deploy container images only from known trusted registries. However, with broader usage of open-source tools, deploying containers from public repositories has become a common and a necessity.

There are many container images stored in public registries. Some of these images are well known, and some of these images are less known, and/or might be malicious. An inexperienced or malicious user could unintentionally or intentionally deploy a malicious container that interferes with operations of other containers.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

The embodiments described herein are related to a computing system or a method for training and/or using one or more machine-learning models for detecting anomalous deployment configurations of container images via a container orchestration service.

The one or more machine-learning models are trained on data associated with historical deployment configurations of container images via the container orchestration service. A computing system is configured to perform the training. First, the computing system is configured to obtain training data associated with historical deployment configurations of a container image. For the historical deployment configurations of the container image, a plurality of features are extracted based on the training data. The computing system then selects one or more collections of features among the plurality of features. Each collection of features is a subset of the plurality of features. For each of the one or more collections of features, an anomaly detection model is trained using machine learning, such that the anomaly detection model is configured to generate a probability score for a given dataset associated with deployment configurations of a container image, indicating a probability that the deployment of the container is anomalous compared to the plurality of historical deployments of containers.

In some embodiments, the computing system is further configured to assign a weight to each of the one or more anomaly detection models. The computing system then creates a combined anomaly detection model configured to generate an overall weighted probability score based on probability scores generated by the one or more anomaly detection models and their corresponding weights.

In some embodiments, a first anomaly detection model is trained based on first data associated with a first plurality of historical deployment configurations of a specific version of a container image, and a second anomaly detection model is trained based on second data associated with a second plurality of historical deployment configurations for all versions of a container image. In response to receiving a dataset associated with deployment configurations of a container image, the first anomaly detection model is configured to generate a first probability score, indicating a first probability that the deployment configurations of the specific version of the container image are anomalous compared to the first plurality of historical deployment configurations; and the second anomaly detection model is configured to generate a second probability score, indicating a second probability that the deployment configurations of all versions of the container image are anomalous compared to the second plurality of historical deployment configurations. The computing system then generates a combined model configured to generate an overall consistency score in response to receiving the dataset associated with the deployment configurations based on the first probability score and the second probability score.

The trained machine-learning model(s) can then be used for detecting anomalous deployment configurations of container images. In some embodiments, a computing system, which may or may not be the same computing system that has trained the machine-learning model(s), is configured to collect one or more datasets associated with one or more deployment configurations via a container orchestration service. The one or more datasets can be collected from at least one of the following sources: (1) a client device, (2) a manifest file, (3) an audit log that records different events associated with the deployment of the container image, and/or (4) a registry storing the container image.

Next, the computing system is configured to extract a plurality of features based on the one or more datasets for an ID of the container image. The machine-learning model is then used to generate a probability score based on the plurality of features. The probability score indicates whether the deployment configurations of the container image are anomalous or not anomalous when compared to the historical deployment configurations of the container image. An allow list is generated that includes container images and their respective IDs that have one or more deployment configurations that are not anomalous.

In some embodiments, the computing system removes a container image and its respective ID that was previously included on the allow list when it is determined that the previously listed container image subsequently has one or more deployment configurations that are anomalous. In other embodiments, the computing system generates a security alert for container images having anomalous deployment configurations. In other embodiments, the one or more deployment configurations of the container image are anomalous when the probability score is greater than a threshold.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not, therefore, to be considered to be limiting in scope, embodiments will be described and explained with additional specificity and details through the use of the accompanying drawings in which.

DETAILED DESCRIPTION

Figure 1:
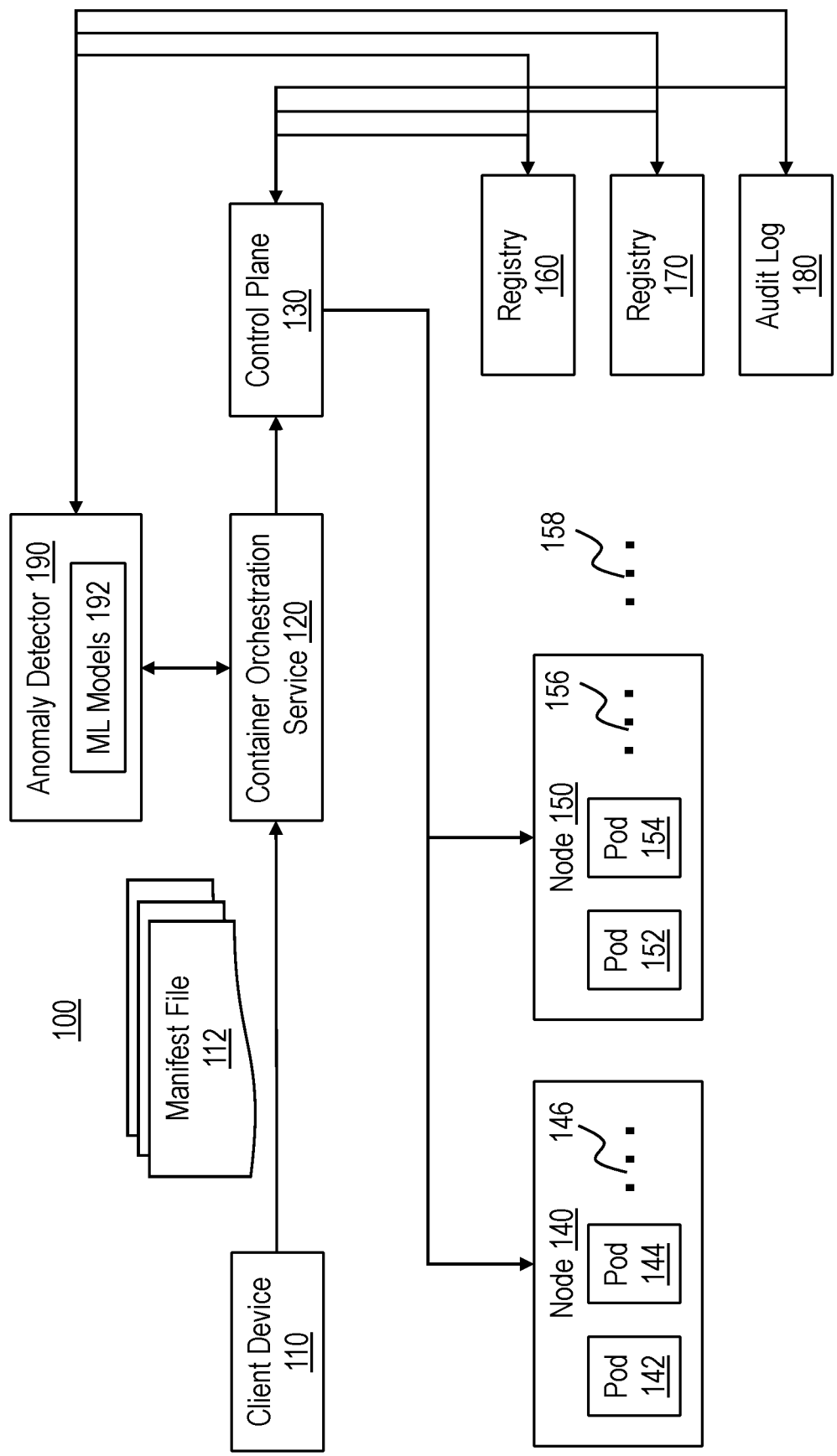
FIG. 1 illustrates an example container network that implements the principles described herein.

The embodiments described herein are related to a computing system or a method for training and/or using one or more machine-learning models for generating an allow list of container images based deployment configurations at a container orchestration service.

A container orchestration service, such as Kubernetes®, is a service that automates deploying, running, and scaling applications running in many containers on top of many machines. For example, the container orchestration service is configured to schedule a particular container to run on a particular machine, and the container orchestration service is also configured to monitor the status of the containers, as well as scaling the deployed application.

To start a new container, an image of the container is required. The container image contains all the software a machine needs to run within the container. Container images are often stored in a container registry. There are public registries, such as the public Docker® hub, or private registries, such as Azure® container registry. While public registries are simple to use, private registries are more secure, allowing role-based access control and gate which images get pushed to the repository. As a rule of thumb, users should deploy images only from known trusted sources. However, with broader usage of open-source tools, deploying containers from public repositories has become common and a necessity. There are many container images stored in registries.

Whenever a container image is generated, a unique ID is associated with the container image. In addition, it is often common for several new versions of a container image to be generated. In some instances, the new versions will be placed in the same registry as the original version. In other instances, the new versions may be copied into a different registry. In both of these instances, the new versions should be associated with their own unique ID.

In addition to the unique ID, each version of the container images is associated with one or more deployment configurations. The deployment configurations are rules or directions that specify how to deploy the container images. The deployment configurations may be listed in a manifest file that is a used in the deployment of the container images or they may be part of the configuration file of the container image.

As discussed above, many of the container images may be stored in various public registries that are not under the control of the end user of the container images. In addition, many of the container images are generated by third parties that are unknown to the end user. This may lead to a malicious party associating a container image with a malicious deployment configuration. For example, the malicious party may associate the container image with a deployment configuration that specifies a sensitive mount point in the end user's memory system. Once the container image is mounted in the memory location, the malicious party may be able to gain access to other data that is stored on the memory.

The principles described herein solve the above problem by detecting anomalous deployment configuration of container images at a container orchestration service, using machine-learning models trained on data associated with historical deployment configurations of container images. The detection of anomalous deployment configurations may be performed before or after the container image is deployed. In response, the system may generate an allow list that adds and removes container images based on whether the deployment configurations of the container images are determined to be anomalous or not. In other embodiments, a security alert may be generated. In some embodiments, when the detection of the anomalous deployment configuration is performed before the completion of the deployment, the deployment is aborted, or a request for the deployment is rejected. In some embodiments, when the detection of the anomalous deployment configuration is performed after the completion of the deployment, the deployed container can be terminated.

Generating an allow list of container images that are not anomalous using machine-learning to detect anomalies in the deployment configurations so that end users know which container images are safe to use provides the technical benefit of generation of the list in near real time without undue increased computation burden. Existing system rely on a generated lists that are difficult to generate and then keep up to date without using a large amount of computing resources.

In addition, in some embodiments, the principles described herein use a probability score for all versions of a container image in a registry based on a canonical identifier that ties all the version together. Including a probability score for all versions of the container image linked by the canonical identifier provides for enhanced levels of consistency in the probability score and thus a more accurate allow list without undue increased computation burden.

As previously mentioned, a container orchestration service, such as Kubernetes®, is a service that automates deploying, running, and scaling applications running in many containers on top of many machines. In some embodiments, a basic scheduling element is called a "pod." A pod is a container that contains one or more sub-containers. When a pod contains multiple containers, these containers share a same file system and a same network namespace. In such an orchestration service, a deployment provides a layer of functionality around pods. A deployment allows a user to create one or more pods from a same definition and to perform updates to the deployed pods.

A deployment can also help with scaling applications. In some embodiments, a deployment creates a ReplicaSet, which in turn will create replica pods. A ReplicaSet is an object in the container orchestration service. The purpose of a ReplicaSet is to maintain a stable set of replica pods running at any given time. If a user performs updates on a deployment, the container orchestration service will create a new ReplicaSet that will contain the updated pods. The container orchestration service will start a few new pods, verify those are running correctly, and if so, the container orchestration service will terminate the old pods and continue this loop until new pods are running.

A typical container cluster includes a number of master nodes and a number of worker nodes. The master nodes include a container orchestration service API and a database that contains the cluster state that make up a control plane. The worker nodes are the machines that run an actual workload. The container orchestration service makes it easier to create a cluster. When a user requests for creating a container cluster, the container orchestration service sets up the master nodes automatically. The container orchestration service will then create one or more virtual machine scale sets (VMSS) in a subscription of the user and turns virtual machines (VMs) in these VMSSs into worker nodes of the container cluster. Applications can then be run on the container cluster.

Note, for an application to run on the container cluster, the application needs to be packaged as a container, wrapped in a pod, and deployed via a manifest file. For example, a user may write an application in a language of choice. The user then builds the application into a container image and store it in a registry. Next, a pod is defined in a manifest file for running the containerized application. Once the pod is defined, the pod can be deployed to the container cluster.

FIG. 1 illustrates an example container network 100 that implements the principles described herein. As illustrated in FIG. 1, a container orchestration service 120 is configured to create and maintain a cluster in the container network 100, including a control plane 130 (which includes one or more master nodes) and a plurality of worker nodes 140, 150.

Each worker node 140, 150 runs one or more pods. For example, node 140 runs pods 142, 144, and node 150 runs pod 152, 154. The ellipsis 146, 156 represents that there may be any number of pods running in the node 140 or 150. The ellipsis 158 represents that there may be any number of nodes in the cluster in the container network.

A client device 110 is configured to send a manifest file 112 to the container orchestration service 120. In response to receiving the manifest file 112, the container orchestration service 120 is configured to deploy a pod on a particular node in the cluster. The particular node is configured to retrieve a container image corresponding to the pod from a registry 160 or 170 based on the manifest file 112 and run the pod based on the container image. There may be any number of registries. Some registries are public registries, and some registries are private registries. In some cases, the image corresponding to the pod may be stored on a public registry by another user or entity and shared with the public, e.g., open-source applications. In some cases, the image corresponding to the pod may be generated and stored on a registry (public or private) by the user of the client device 110 that requests the deployment of the pod.

In some embodiments, the container orchestration service 120 is also set up to monitor and audit certain events, such as non-repudiations. A non-repudiation is proving certain actions have been carried out by certain users, including what happened, when it happened, and who made it happen, where it happened, why it happened, and/or how it happened. The container orchestration service 120 can be set up to collect such events and/or non-repudiations from different components in the container network 100, including (but not limited to) container runtimes, control plane, and/or applications running on the cluster. The collected events can then be recorded in an audit log 180. In some embodiments, the container orchestration service 120 can deploy an agent to all nodes, and the agent is tasked to collect events and record the collected events in audit logs 180.

As shown in FIG. 1, an anomaly detector 190 is coupled to the container orchestration service 120 configured to use audit log 180 and/or data collected from other sources to detect anomalous deployment configurations of container images using one or more machine-learning models 192. The one or more machine-learning models 192 are trained on data associated with deployment configurations of container images that have occurred on the container network 100.

Figure 2A:
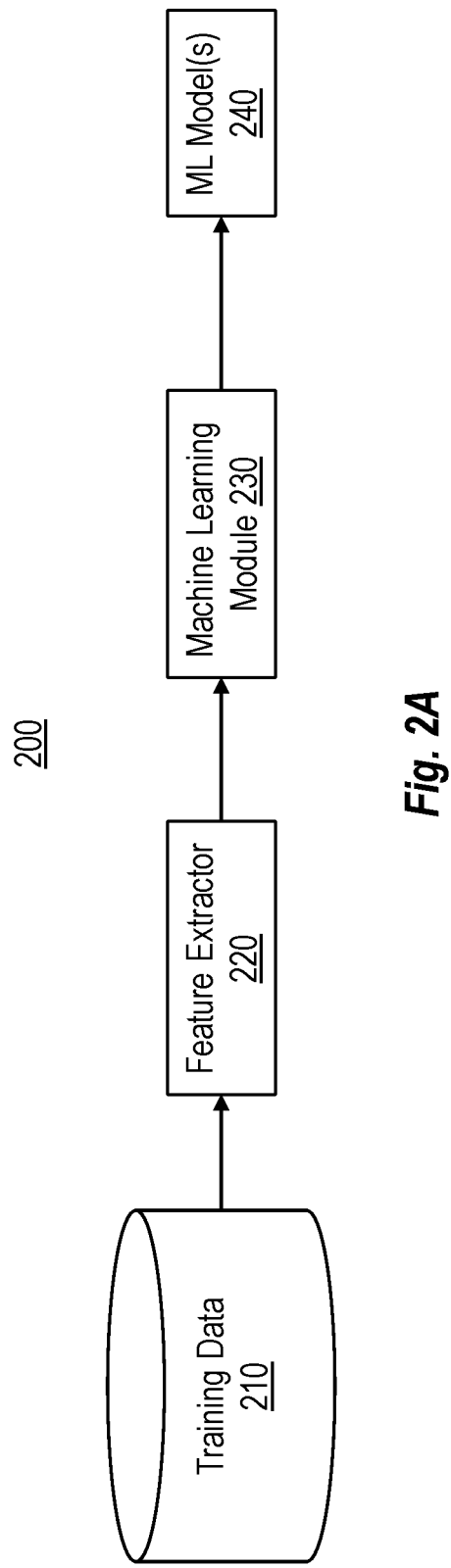
FIG. 2A illustrates an example machine-learning network configured to train one or more machine learning models for detecting anomalous deployment configurations of container images.

FIG. 2A illustrates an example machine-learning network 200 configured to train one or more machine-learning models 240, which corresponds to the machine-learning model(s) 192 in FIG. 1. The training is performed by a computing system that may or may not be the same computing system that provides the container orchestration service 120 in FIG. 1. Training data 210 includes data associated with a plurality of instances of historical deployment configurations of different versions of container images that have been deployed via the container orchestration service. The training data 210 is processed by a feature extractor 220 configured to extract a plurality of features which correspond to the different deployment configurations that may be associated with the different versions of an image. For example, for each of the plurality of instances of historical deployment configurations of different versions of container images, a plurality of features are extracted based on the training data.

In some embodiments, the training data associated with each historical deployment includes one or more datasets associated with at least one of (1) a client device that performed the deployment, (2) an application or workload definition file, (3) an audit log that records different events associated with the deployment of the container, or (4) the container image that is stored in a registry. In some embodiments, the plurality of features corresponding to different deployment configurations includes, but are not limited to, one or more mounting points for the container image in storage of a host system, permissions for the underlying application of the container image in the host system, service accounts that the underlying application of container image will be associated with, and whether the underlying application of the container image will be privileged or not in the system. It will be appreciated that the embodiments disclosed herein may be related to any number of different types of deployment configurations for a container image. Accordingly, the embodiments disclosed herein are not limited to any number or type of deployment configuration associated with a container image.

The machine learning model 230 is then configured to analyze the plurality of features corresponding to the deployment configurations to train the one or more machine-learning model(s) 240. The one or more machine-learning model(s) 240 are trained to detect anomalous deployment configurations of container images. For example, for a given version of a container image, the one or more machine-learning model(s) 240 are configured to determine a probability that the deployment configurations associated with the specific version the container image is anomalous compared to the plurality of historical deployment configurations of container images contained in the training data 210.

In some embodiments, for each version of a container image, a separate anomaly detection model is trained. As such, multiple machine-learning models are trained to detect anomalous deployment configurations for different versions of a container image. Different machine-learning techniques may be implemented in training the anomaly detection models for each version of the container image. In some embodiments, distance-based anomaly detection techniques are used to train a model to detect a distance between a new deployment configuration and a normal or expected deployment configuration. In some embodiments, clustering-based anomaly detection techniques are used to train a model to detect whether a new deployment configuration is within one or more clusters. Many different algorithms may be used to train the models, including supervised and non-supervised training, e.g., (but not limited to) logistic regression, isolation forest, k-nearest neighbors, support vector machines (SVM), density-based algorithm, elliptic envelope, local outlier factor, Z-score, Boxplot, statistical techniques, and/or time series techniques.

Figure 2B:
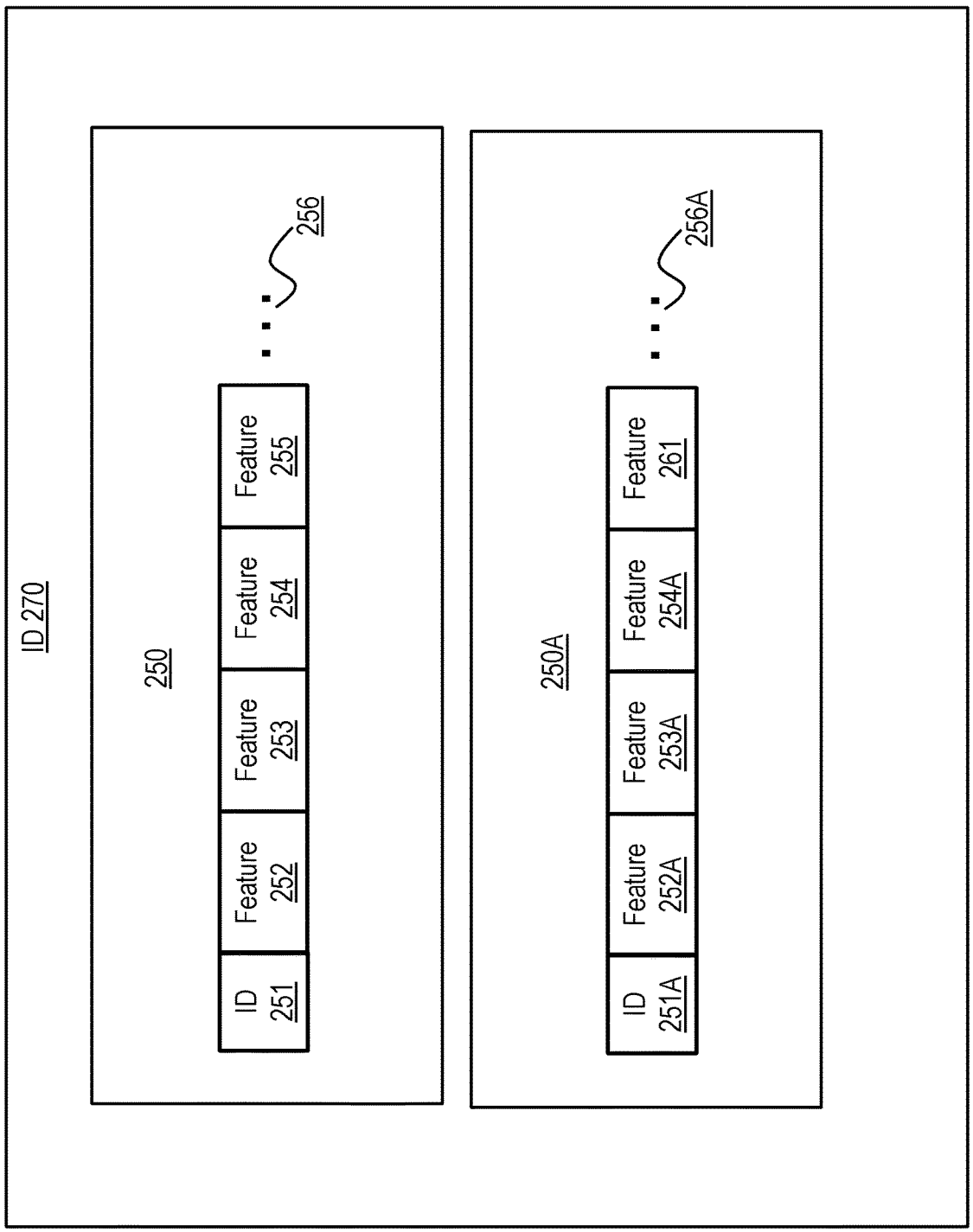
FIG. 2B illustrates an example partial data structure of container images.

FIG. 2B illustrates an embodiment of an example partial data structure of a first version of a container image denoted by 250. As illustrated, the container image 250 is associated with an identifier 251 that is unique to the container image 250 and that identifies the container image 250. As further illustrated, the container image 250 includes various features 252, 253, 254, and 255 which correspond to various deployment configurations associated with the container image 250. The ellipses 256 illustrate the container image 250 may include additional features that correspond to deployment configurations as well as the underlying application of the container image. Although the first version of the container image 250 is shown as including multiple features that correspond deployment configurations, this need not be the case as the container image 250 may only include one deployment configuration as circumstances warrant.

FIG. 2B also illustrates an embodiment of an example partial data structure of a second version of the container image denoted by 250A. As illustrated, the container image 250A is associated with an identifier 251A that is unique to the container image 250A and that identifies the container image 250A. As further illustrated, the container image 250A includes various features 252A, 253A, and 254A which correspond to various deployment configurations associated with the container image 250A and also correspond to the features or deployment configurations of 252, 253, and 254 of container image 250. The ellipses 256A illustrate the container image 250A may include additional features that correspond to deployment configurations as well as the underlying application of the container image. Thus, the container image 250A illustrates that the first version of the container image 250 may be copied into the same registry or a new registry as circumstances warrant.

FIG. 2B also shows that the second version of the container image 250A also includes a feature 261 that corresponds to a deployment configuration. As can be seen in the figure, the feature 261 is not included in the first version of the container image 250, thus illustrating that additional deployment configurations can be added to a new version of a container image. Accordingly, if the feature 261 is anomalous, the embodiment disclosed herein will detect the anomaly. Although the second version of the container image 250A is shown as including multiple features that correspond deployment configurations, this need not be the case as the container image 250A may only include one deployment configuration as circumstances warrant. Although not illustrated, any number of additional versions of the container image may be generated as circumstances warrant.

In some embodiments, several versions of a container image may be stored in the same repository. In such embodiments, it is possible to associate all the versions of the container image with a canonical ID that connects all the versions of the container image. In FIG. 2B, the canonical ID is denoted by 270. The canonical ID may be generated in many different ways. Accordingly, the embodiments disclosed herein are not limited by how the canonical ID 270 is generated.

In some embodiments, the computing system is further configured to assign a weight to each of the one or more anomaly detection models. The computing system then creates a combined anomaly detection model configured to generate an overall weighted probability score based on probability scores generated by the one or more anomaly detection models and their corresponding weights.

In some embodiments, a first anomaly detection model is trained based on first data associated with a first plurality of historical deployment configurations, and a second anomaly detection model is trained based on second data associated with a second plurality of historical deployment configurations. In response to receiving a dataset associated with deployment configurations of the container image, the first anomaly detection model is configured to generate a first probability score, indicating a first probability that the deployment configurations of the container image is anomalous compared to the first plurality of historical deployments; and the second anomaly detection model is configured to generate a second probability score, indicating a second probability that the deployment configurations of the container image is anomalous compared to the second plurality of historical deployment configurations. The computing system then generates a combined model configured to generate an overall score in response to receiving the dataset associated with the deployment configurations of the container image based on the first probability score and the second probability score.

In some embodiments, the computing system assigns a first weight to the first anomaly detection model, and assigns a second weight to the second anomaly detection model. The combined anomaly detection model is configured to generate an overall weighted probability based on the first probability score, the first weight, the second probability score, and the second weight.

Figure 3:
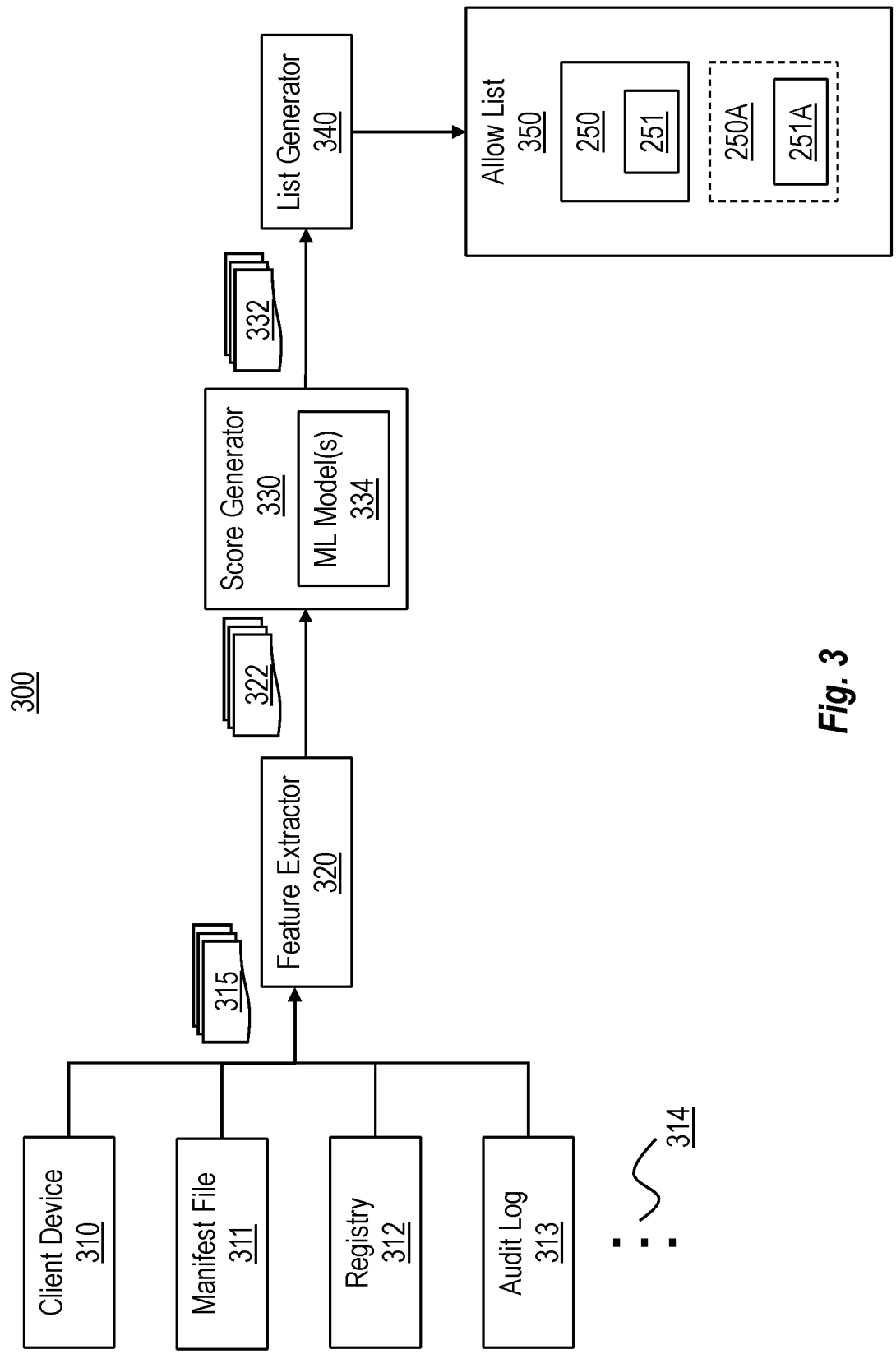
FIG. 3 illustrates an example architecture of the anomaly detector of FIG. 1.

The trained machine-learning model(s) 240 can then be used by an anomaly detector 190 for detecting anomalous deployment configurations of container images at a container orchestration service 120. FIG. 3 illustrates an example architecture of an anomaly detector 300, which corresponds to the anomaly detector 190 in FIG. 1. As illustrated in FIG. 3, the anomaly detector 300 includes a feature extractor 320 configured to obtain one or more datasets 315 associated with deployment configurations of a version of a container image. The one or more datasets 315 can be obtained from at least one of (1) a client device 310 that has requested for the deployment of the container, (2) a manifest file 311, such as (but not limited to) a YAML file, (3) a registry 312 that stores an image of the container, and/or (4) an audit log 313 that records different events associated with the deployment of the container and that may correspond to the audit log 180. The ellipsis 314 represents that there may be additional sources that the feature extractor 320 may obtain dataset from.

In response to receiving the one or more datasets 315 associated with the deployment configurations of the container image, the feature extractor 320 is configured to extract a plurality of features 322 from the datasets 315. In some embodiments, the plurality of features 322 corresponding to the deployment configurations may include any deployment configuration including, but not limited to, one or more mounting points for the container image in storage of a host system, permissions for the underlying application of the container image in the host system, service accounts that the underlying application of container image will be associated with, and whether the underlying application of the container image will be privileged or not in the system.

The extracted plurality of features 322 are then fed into a score generator 330. The score generator 330 embodies one or more machine-learning model(s) 334 that correspond to the machine-learning model(s) 240 of FIG. 2A trained on data associated with historical deployment configurations of container images. The one or more machine-learning model(s) 334 is configured to generate a probability score 332, indicating a probability that one or more of the deployment configurations of the container image is anomalous.

The probability score 332 is then processed by a list generator 340. In some embodiments, when the probability score 332 is less than a predetermined threshold, thus indicating that the deployment configurations are not anomalous, the list generator is configured to add the container image associated with the deployment configurations to an allow list 350 of container images that are trusted as being non-anomalous. For example, as shown in the figure, the first version of the container image 250 along with its associated ID 251 and the second version of the container image 250A along with its associated ID 251A may be added to the allow list 350 when it is determined that the probability score 332 for each version of the container image is less than the predetermined threshold.

In other embodiments, when the probability score is more than the predetermined threshold, thus indicating that the deployment configurations are anomalous, the list generator is configured to not add the container image associated with the deployment configurations to the allow list 350 of container images that are trusted as being non-anomalous. In some embodiments, the deployment configurations associated with a container image may be determined to be non-anomalous at a prior point in time and the thus the container image is added to the allow list 350. However, as the machine learning models continue to learn, it is possible that deployment configurations of a container image included in the allow list 350 are later determined to become anomalous. For example, new deployment configurations may be added to the container image that cause the probability score 332 to be more than the predetermined threshold. In such cases, the container image may be removed from the allow list 350. The dashed lines around container image 250A are to illustrate that the container image 250A was initially considered trusted as being non-anomalous and was added to the allow list 350. However, at a later time the container image 250A had one or more deployment configurations that were determined to be anomalous and the container image 250A was removed from the allow list. Of course, at a still later time, the deployment configurations of the container image 250A may again be found to be non-anomalous in the manner previously described and the container image 250A may be again added to the allow list 350. Accordingly, the contents of the allow list 350 are dynamically added and removed as the machine learning models continue to improve their learning about what constitutes an anomalous deployment configuration for a container image.

In some embodiments, the probability score may indicate that a given container image has some deployment configurations that are anomalous and some that are non-anomalous. In such embodiments, the list generator 340 determines a percentage of the anomalous deployment configurations and a percentage of the non-anomalous deployment configurations. When the percentage of non-anomalous deployment configurations is larger than the percentage of anomalous deployment configurations, thus showing that a majority of the deployment configurations are non-anomalous, the list generator 340 will add the container image and its ID to the allow list 350. Accordingly, in some embodiments a container image need not have all its deployment configurations be non-anomalous before being added to the allow list.

In some embodiments, the list generator 340 may also function as an alert generator that is configured to generate a security alert. In some embodiments, the alert generator sends the alert to the container orchestration service 120. When the container orchestration service 120 receives the alert, the deployment of the container image may or may not have completed yet. In some embodiments, when the alert is generated before the deployment of the container image, the container orchestration service 120 is configured to block the deployment of the container image. In some embodiments, when the alert is generated after the deployment of the container image, the container orchestration service 120 is configured to terminate the container image.

Figure 4A:
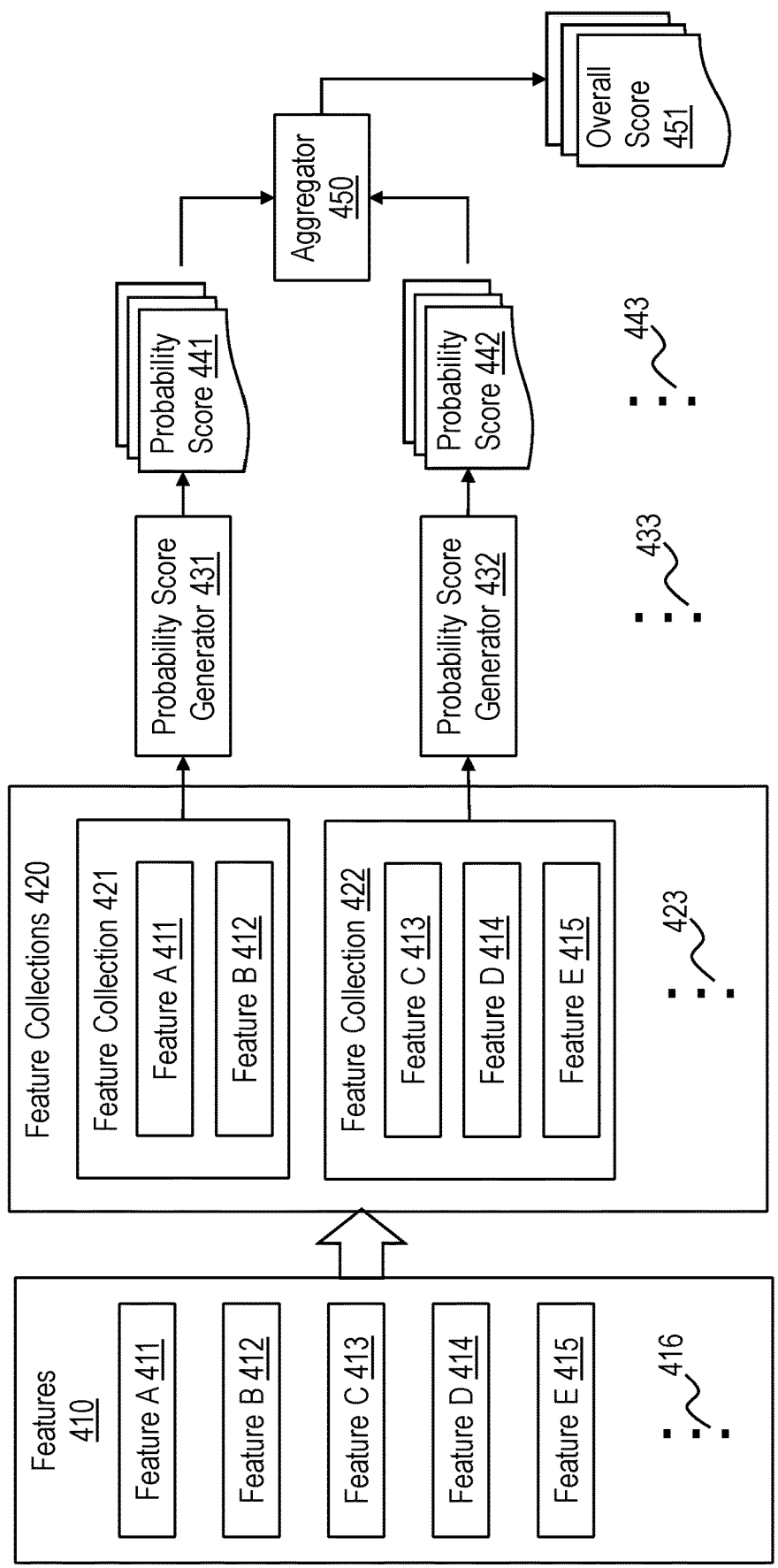
FIGS. 4A-4B illustrates example architectures of the score generator of FIG. 3.
Figure 4B:
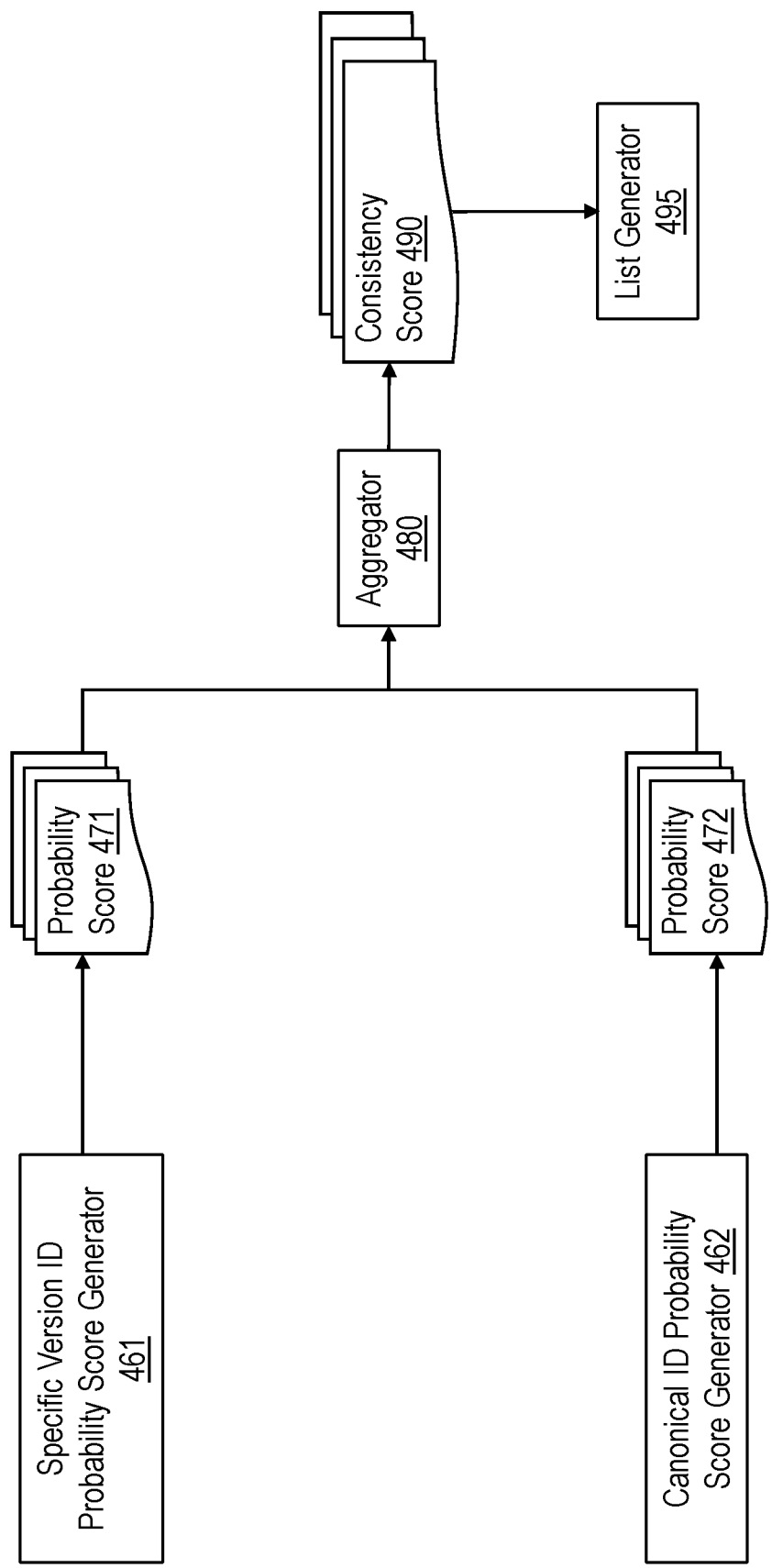

As briefly discussed above, the score generator 330 embodies one or more machine-learning model(s) 334 trained on data associated with historical instances of deployment configurations of container images. FIGS. 4A-4B further illustrate example architecture of the score generator 330 that implement multiple machine-learning models, each of which is configured to generate a probability score. The multiple probability scores can then be aggregated into an overall probability score.

As shown in FIG. 4A, a plurality of features 410 (which correspond to the features 322 of FIG. 3) are grouped into one or more feature collections 420. The plurality of features 410 include feature A 411, feature B 412, feature C 413, feature D 414, feature E 415, etc. The ellipsis 416 represents that there may be any natural number of features extracted from the dataset associated with historical deployments of containers. The plurality of features 410 are then grouped into one or more feature collections 420. Each feature collection (also referred to as a collection of features) includes a subset of the plurality of features 410. For example, feature collection 421 includes feature A 411 and feature B 412; and feature collection 422 includes feature C 413, feature D 414, and feature E 415. The ellipsis 423 represents that there may be any natural number of feature collections.

Each feature collection 421, 422 is then fed into a corresponding probability score generator 431, 432. The probability score generators 431, 432 embody different machine-learning models trained on the corresponding feature collections associated with the historical deployments of containers. In particular, the probability score generator 431 is configured to process the feature collection 421 (including feature A 411 and feature B 412) to generate a first probability score 441. The probability score generator 432 is configured to process the feature collection 422 (including feature C 413, feature D 414, and feature E 415) to generate a second probability score 442. The ellipsis 433 and 443 represent that there may be any number of probability score generators configured to generate different probability scores based on different feature collections.

The different probability scores 441, 442 can then be fed into an aggregator 450, which aggregates the multiple probability scores 441, 442 into an overall probability score 451. The aggregator 450 may integrate different algorithms to aggregate the multiple probability scores 441, 442. For example, in some embodiments, the aggregator identifies anomaly only when at least two probability scores indicate anomaly. In some embodiments, the aggregator 450 is configured to assign a weight to each of the different probability scores 441, 442 to generate a weighted average, and the weighted average is used as an overall probability score 451.

For example, feature A 411 may be a registry account name, and feature B 412 may be a tool used to perform the deployment. A user with the registry account name may have been using a first tool in the past. When a second tool is used in a new deployment associated with the same registry account, the probability score generator 431 may generate a first probability score 441, indicating that the new deployment is anomalous. As another example, feature C 413 may be a namespace, feature D 414 may be a day of a week, and feature E 415 may be a time of a day. A user who works on the namespace may have been working during 9 to 5 on weekdays. When a new deployment associated with the same namespace occurs at midnight on Saturday, the probability score generator 432 may generate a second probability score 442, indicating the new deployment is anomalous. The first probability score 441 and the second probability score 442 are then fed into the aggregator 450. The aggregator 450 may then generate an overall probability score 451.

In some embodiments, the one or more machine-learning models 334 include a plurality of models trained on different datasets. For example, a first machine-learning model is trained on a first set of historical data, and a second machine-learning model is As such, the first machine-learning model is trained to determine whether deployment configurations of a specific version of a container image are anomalous compared to the historical deployment configurations of the specific version of the container image. The second machine-learning model is trained to determine whether deployment configurations of all versions of a container image are anomalous compared to the historical deployment configurations of all the versions of the container image. The first probability score and the second probability score can also be integrated into an overall consistency score, indicating an overall probability that the deployment configurations are anomalous or non-anomalous. In other words, the probability score of a specific version of a container image is combined with the probability score of all versions of the container image to find a score that measures how consistent the one or more deployment configurations of the specific version of the container image. The more consistent the deployment configurations are, the more likely they are to be non-anomalous.

FIG. 4B illustrates an example of implementing a plurality of hierarchical machine-learning models, namely, a probability score generator 461 that is configured to generate a probability score for a specific version ID of a container image and a probability score generator 462 that is configured to generate a probability score for all versions of a container image associated with a canonical ID such as canonical ID 270, each of which is trained on different datasets. Each of the probability score generator 461 and probability score generator 462 corresponds to a machine-learning model 240 trained on data associated with historical deployment configurations of container images, except that the probability score generator 461 is trained on datasets related to a specific container image ID and probability score generator 462 is trained on datasets related to all versions of the container image associated with the canonical ID.

In some embodiments, each of probability score generator 461 and probability score generator 462 also includes multiple machine learning models and an aggregator 480 configured to aggregate multiple probability scores into an overall consistency score 490. As such, in response to receiving datasets associated with deployment configurations of a container image, probability score generator 461 is configured to generate a first overall probability score 471, indicating a probability that the deployment configurations are anomalous compared to the historical deployment configurations for a specific version ID of the container image and probability score generator 462 is configured to generate a second overall probability score 472, indicating a probability that the deployment configurations are anomalous compared to the historical deployment configurations of all versions of the container image associated with the canonical ID 270.

The first overall probability score 471 and the second overall probability score 472 are then fed into the aggregator 480, which is configured to aggregate the scores 471 and 472 into an overall consistency score 490. In some embodiments, the aggregator 480 assigns a weight to each of the scores 471 and 472 and generates a weighted average based on the scores 471 and 472 and their corresponding weights. The overall consistency score 490 can then be used by a list generator 495 that corresponds to the list generator 340 to generate an allow list such as the allow list 350.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
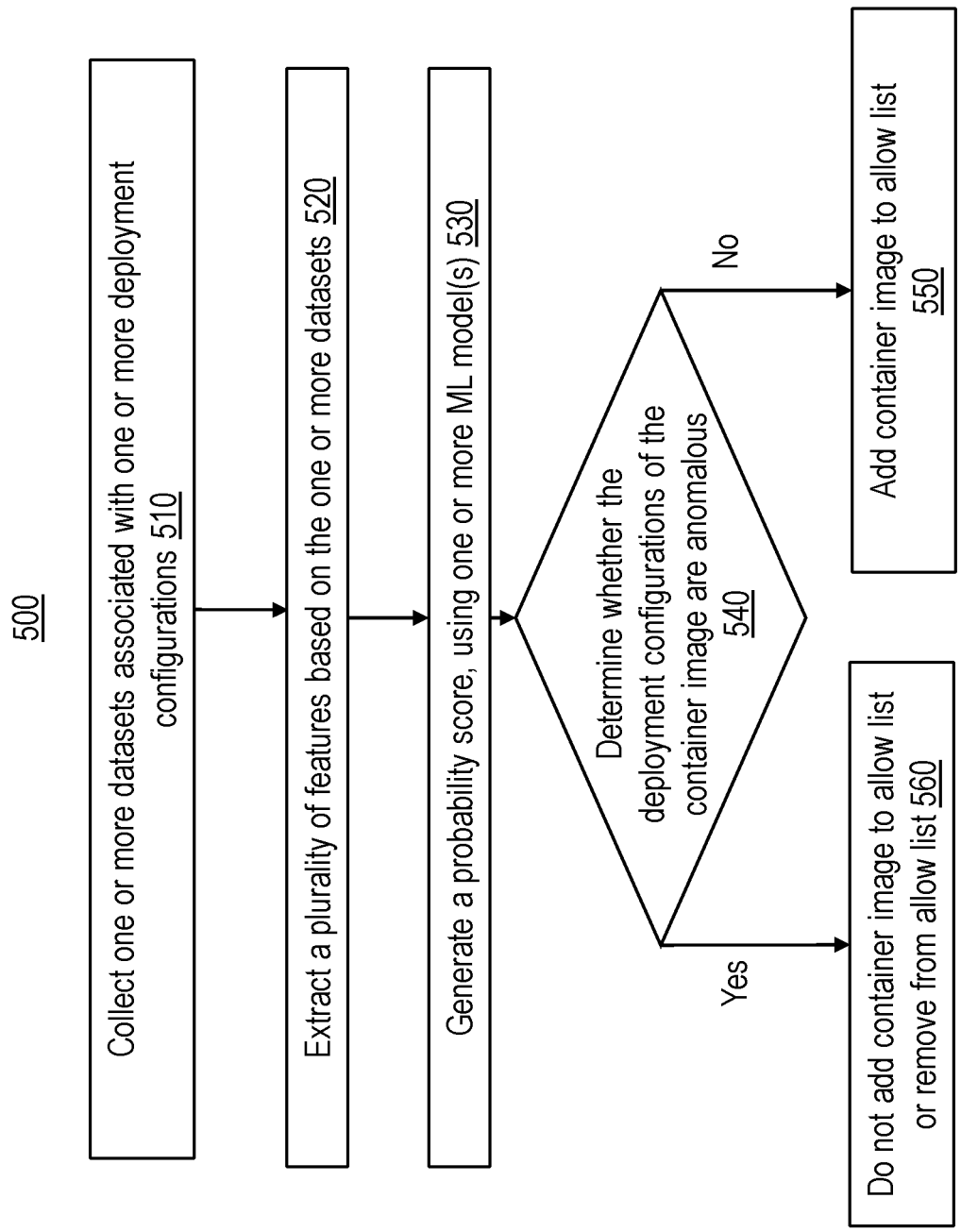
FIG. 5 illustrates a flowchart of an example method for detecting anomalous deployment configurations of container images.

FIG. 5 illustrates a flowchart of an example method 500 of detecting anomalous deployment configurations of a container image via a container orchestration service, using machine-learning model(s) trained on data associated with historical deployment configurations of container images. The method 500 includes collecting one or more datasets associated with one or more deployment configurations of the container image (act 510). In some embodiments, act 520 includes collecting the one or more datasets from a client device, a manifest file, an audit log that records different events associated with the deployment of the container image, or a registry that stores the container image.

The method 500 also includes extracting a plurality of features based on the one or more datasets for an ID of the container image (act 520). In some embodiments, the plurality of features includes (but are not limited to) one or more mounting points for the container image in storage of a host system, permissions for the underlying application of the container image in the host system, service accounts that the underlying application of container image will be associated with, and whether the underlying application of the container image will be privileged or not in the system. Thereafter, a probability score is generated based on the plurality of features, using one or more machine-learning model(s), trained on data associated with historical deployment configurations of container images that are performed via the container orchestration service (act 530). It is then determined whether the deployment configurations of the container image are anomalous or are not anomalous (act 540). In some embodiments, when the probability score is greater than a predetermined threshold, the deployment configurations of the container image are determined as anomalous.

When the one or more deployment configurations are not determined to be anomalous, then the container image and its respective ID are added to the allow list (act 550). When the one or more deployment configurations are determined to be anomalous, then the container image and its respective ID are not added to the allow list or, if the container image and its respective ID are already included on the allow list, the container image and its respective ID are removed from the allow list (act 560).

Figure 6:
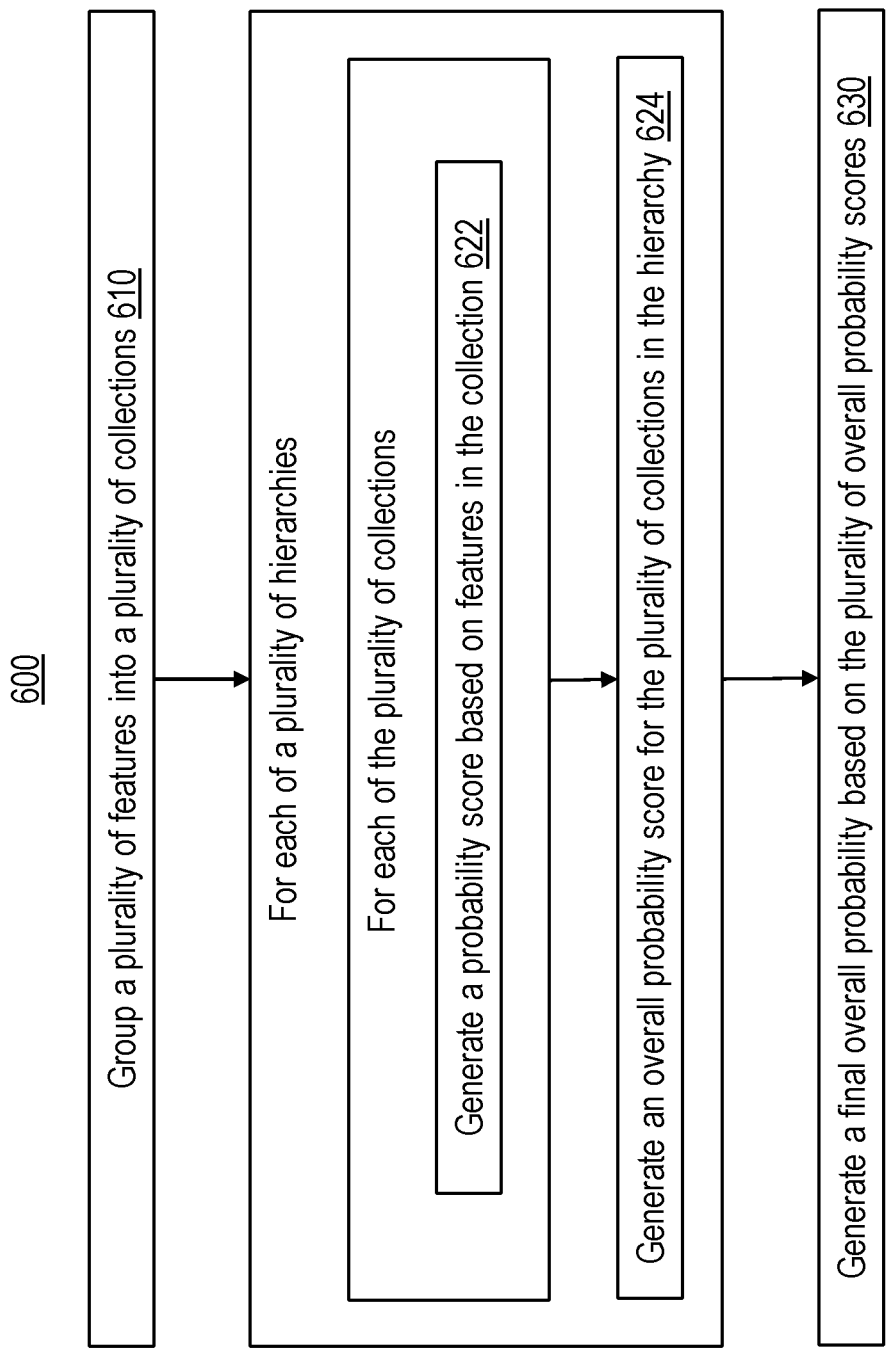
FIG. 6 illustrates a flowchart of an example method for generating a probability score, using one or more machine-learning models.
Figure 7:
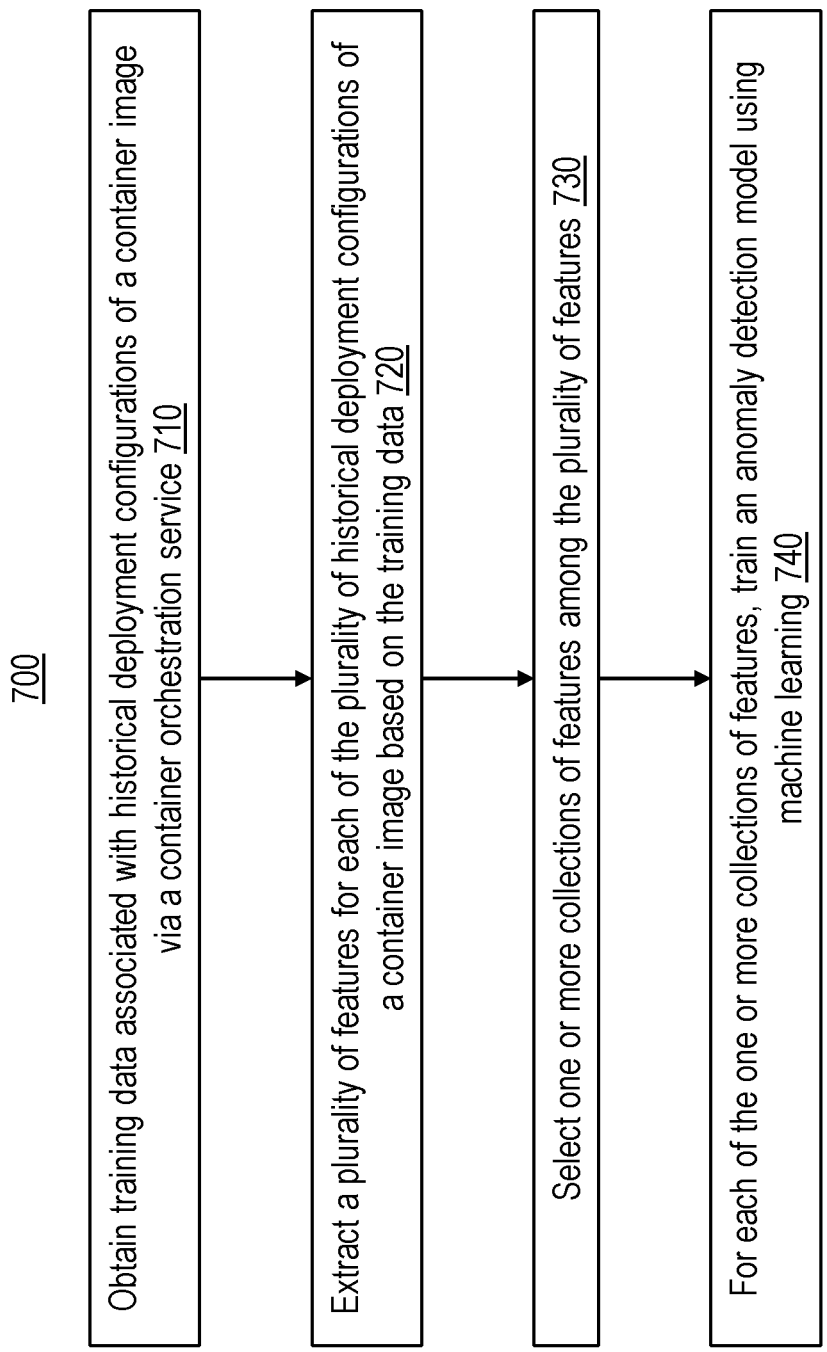
FIG. 7 illustrates a flowchart of an example method for training one or more machine-learning models using data associated with historical deployment configurations of container images via a container orchestration service.

FIG. 6 illustrates a flowchart of an example method 600 for generating a probability score using one or more ML model(s), which corresponds to act 540 of FIG. 7. The method 600 includes grouping a plurality of features into a plurality of collections (act 610). Each collection includes a subset of the plurality of features. For each of a plurality of hierarchies, and for each of the plurality of collections, a probability score is generated based on the features in the collection (act 622). Notably, this is a repetitive process. For each hierarchy, a plurality of probability scores (each of which corresponds to one of the plurality of collections of features) are generated. The plurality of collections for the same hierarchy are then integrated into an overall consistency score (act 624). As such, multiple overall probability scores (each of which corresponds to one of the plurality of hierarchies) are generated. The multiple overall probability scores are then integrated into a final overall consistency score (act 630).

FIG. 7 illustrates a flowchart of an example method for training a machine-learning model for detecting anomalous deployment configurations in container images. The method 700 includes obtaining training data associated with historical deployment configurations of container images via container orchestration service, such as (but not limited to) Kubernetes® (act 710). The method further includes extracting a plurality of features for each of the plurality of historical deployment configurations of container images based on the training data (act 720). Thereafter, one or more collections of features among the plurality of features are selected (act 930). Each collection of features includes a subset of the plurality of features. For each of the one or more collections of features, an anomaly detection model is trained using machine learning (act 740). Different machine-learning techniques may be implemented in different collections of features, depending on the relationship among the features in the collection. In some embodiments, distance-based anomaly detection techniques are used to train a model to detect a distance between the new deployment and a normal deployment. In some embodiments, clustering-based anomaly detection techniques are used to train a model to detect whether a new deployment is within one or more clusters. Many different algorithms may be used to train the models, including supervised and non-supervised algorithms, e.g., (but not limited to) logistic regression, isolation forest, k-nearest neighbors, support vector machines (SVM), density-based algorithm, elliptic envelope, local outlier factor, Z-score, Boxplot, statistical techniques, and/or time series techniques.

Further, as discussed above with respect to FIGS. 4A-4B, different sets of machine learning models may be trained on different-leveled training data for detecting anomalies at different levels. The different sets of machine learning models can then be integrated together to generate an overall probability score, indicating a probability that a given deployment of the container is anomalous.

Finally, because the principles described herein may be performed in the context of a computing system (for example, each of the client device 110, the container orchestration service 120, the anomaly detector 190, and node 140, 150 may include one or more computing systems) some introductory discussion of a computing system will be described with respect to FIG. 8.

Computing systems are now increasingly taking a wide variety of forms. Computing systems may, for example, be hand-held devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 8:
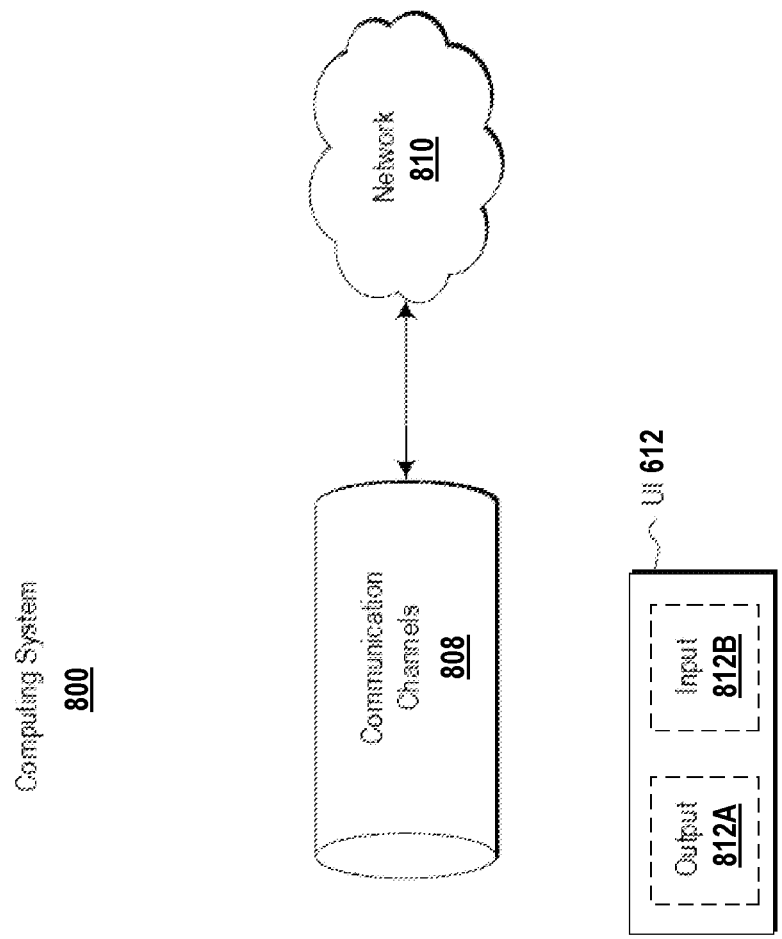
FIG. 8 illustrates an example computing system in which the principles described herein may be employed.
Figure 8:
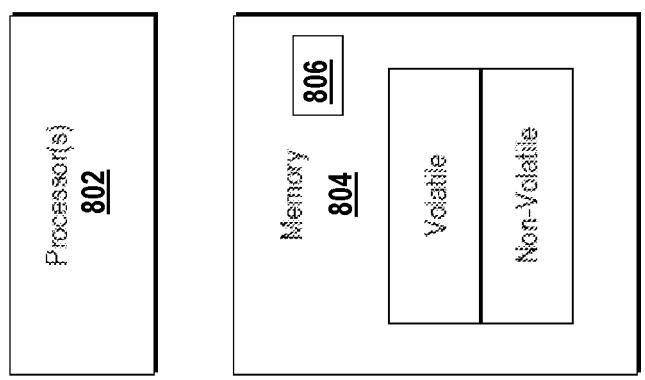

As illustrated in FIG. 8, in its most basic configuration, a computing system 800 typically includes at least one hardware processing unit 802 and memory 804. The processing unit 802 may include a general-purpose processor and may also include a field-programmable gate array (FPGA), an application-specific integrated circuit (ASIC), or any other specialized circuit. The memory 804 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 800 also has thereon multiple structures often referred to as an "executable component". For instance, memory 804 of the computing system 800 is illustrated as including executable component 806. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such a structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hard-wired logic gates, which are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description above, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied in one or more computer-readable media that form a computer program product. An example of such an operation involves the manipulation of data. If such acts are implemented exclusively or near-exclusively in hardware, such as within an FPGA or an ASIC, the computer-executable instructions may be hardcoded or hard-wired logic gates. The computer-executable instructions (and the manipulated data) may be stored in the memory 804 of the computing system 800. Computing system 800 may also contain communication channels 808 that allow the computing system 800 to communicate with other computing systems over, for example, network 810.

While not all computing systems require a user interface, in some embodiments, the computing system 800 includes a user interface system 812 for use in interfacing with a user. The user interface system 812 may include output mechanisms 812A as well as input mechanisms 812B. The principles described herein are not limited to the precise output mechanisms 812A or input mechanisms 812B as such will depend on the nature of the device. However, output mechanisms 812A might include, for instance, speakers, displays, tactile output, holograms, and so forth. Examples of input mechanisms 812B might include, for instance, microphones, touchscreens, holograms, cameras, keyboards, mouse or other pointer input, sensors of any type, and so forth.

Embodiments described herein may comprise or utilize a special purpose or general-purpose computing system, including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hard-wired, wireless, or a combination of hard-wired or wireless) to a computing system, the computing system properly views the connection as a transmission medium. Transmissions media can include a network and/or data links that can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions may configure the computing system to perform a certain function or group of functions. The computer-executable instructions may be, for example, binaries or even instructions that undergo some translation (such as compilation) before direct execution by the processors, such as intermediate format instructions such as assembly language or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, data centers, wearables (such as glasses) and the like. The invention may also be practiced in distributed system environments where local and remote computing systems, which are linked (either by hard-wired data links, wireless data links, or by a combination of hard-wired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing systems which may correspond to the computing system 800 previously described. The computing systems of the remaining figures include various components or functional blocks that may implement the various embodiments disclosed herein, as will be explained. The various components or functional blocks may be implemented on a local computing system or may be implemented on a distributed computing system that includes elements resident in the cloud or that implement aspect of cloud computing. The various components or functional blocks may be implemented as software, hardware, or a combination of software and hardware. The computing systems of the remaining figures may include more or less than the components illustrated in the figures, and some of the components may be combined as circumstances warrant. Although not necessarily illustrated, the various components of the computing systems may access and/or utilize a processor and memory, such as processing unit 802 and memory 804, as needed to perform their various functions.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
one or more processors; and
one or more computer-readable hardware storage devices having stored thereon computer-executable instructions that are structured such that, when executed by the one or more processors, the computer-executable instructions cause the computing system to perform at least:
collect one or more datasets associated with one or more deployment configurations of a container image via a container orchestration service;
extract a plurality of features based on the one or more datasets for an identification (ID) of the container image;
generate a probability score based on the plurality of features, using one or more machine-learning models trained on datasets associated with one or more historical deployment configurations of the container image that have been performed via the container orchestration service, the probability score indicating a probability of whether the one or more deployment configurations of the container image are anomalous or not anomalous when compared to a predetermined threshold that is indicative of whether the one or more deployment configurations of the container image are anomalous or not anomalous when compared to the one or more historical deployment configurations of the container image, wherein generating the probability score comprises:
generating a first probability score based on the plurality of features, using a first machine learning model trained on a first set of historical data associated with an ID of a specific version of the container image;
generating a second probability score based on the plurality of features, using a second machine learning model trained on a second set of historical data associated with an ID of all versions of the container image; and
generating an overall consistency score based on the first probability score and the second probability score; and
in response to determining that the overall consistency score is greater than the predetermined threshold, perform at least one of (1) add the container image to an allow list that includes container images and their respective IDs that have one or more deployment configurations that are not anomalous or (2) generate a security alert.

2. The computing system of claim 1, wherein the computing system is further configured to:
remove a container image and its respective ID that were previously included on the allow list when it is determined that the container image subsequently has one or more deployment configurations that are anomalous.

3. The computing system of claim 1, wherein the computing system is further configured to:
in response to determining that the one or more deployment configurations of the container image are anomalous, generate the security alert.

4. The computing system of claim 1, wherein collecting one or more datasets includes collecting a dataset from at least one of (1) a client device, (2) a manifest file, (3) an audit log that records different events associated with a deployment of the one or more deployment configurations of the container image, or (4) a registry that stores the container image.

5. The computing system of claim 1, wherein the one or more deployment configurations of the container image include at least one of (1) permissions for an underlying application of the container image in a host system, (2) service accounts that the underlying application of container image will be associated with, or (3) whether the underlying application of the one or more deployment configurations of the container image will be privileged or not in the system.

6. The computing system of claim 1, wherein the one or more deployment configurations of the container image are anomalous when the probability score is greater than the predetermined threshold.

7. The computing system of claim 1, wherein generating an overall consistency score based on the first probability score and the second probability score includes:
assigning a first weight to the first probability score;
assigning a second weight to the second probability score; and
generating a weighted overall probability score based on the first probability score, the first weight, the second probability score, and the second weight.

8. A method implemented at a computing system for detecting anomalies in deployment configurations of container images at a container network, the method comprising:
collecting one or more datasets associated with one or more deployment configurations of a container image via a container orchestration service;
extracting a plurality of features based on the one or more datasets for an identification (ID) of the container image;
generating a probability score based on the plurality of features, using one or more machine-learning models trained on datasets associated with one or more historical deployment configurations of the container image that have been performed via the container orchestration service, the probability score indicating a probability of whether the one or more deployment configurations of the container image are anomalous or not anomalous when compared to a predetermined threshold that is indicative of whether the one or more deployment configurations of the container image are anomalous or not anomalous when compared to the one or more historical deployment configurations of the container image, wherein generating the probability score comprises:
generating a first probability score based on the plurality of features, using a first machine learning model trained on a first set of historical data associated with an ID of a specific version of the container image;
generating a second probability score based on the plurality of features, using a second machine learning model trained on a second set of historical data associated with an ID of all versions of the container image; and
generating an overall consistency score based on the first probability score and the second probability score; and
in response to determining that the overall consistency score is greater than the predetermined threshold, performing at least one of (1) add the container image to an allow list that includes container images and their respective IDs that have one or more deployment configurations that are not anomalous or (2) generate a security alert.

9. The method of claim 8, further comprising:
removing a container image and its respective ID that was previously included on the allow list when it is determined that the container image subsequently has one or more deployment configurations that are anomalous.

10. The method of claim 8, further comprising:
in response to determining that the one or more deployment configurations of the container image are anomalous, generating the security alert.

11. The method of claim 8, wherein collecting one or more datasets includes collecting a dataset from at least one of (1) a client device, (2) a manifest file, (3) an audit log that records different events associated with the deployment of the one or more deployment configurations of the container image, or (4) a registry that stores the container image.

12. The method of claim 8, wherein the one or more deployment configurations of the container image include at least one of (1) permissions for an underlying application of the container image in a host system, (2) service accounts that the underlying application of container image will be associated with, or (3) whether the underlying application of the container image will be privileged or not in the system.

13. The method of claim 8, wherein the one or more deployment configurations of the container image are anomalous when the probability score is greater than the predetermined threshold.

14. The method of claim 8, wherein generating an overall consistency score based on the first probability score and the second probability score includes:
assigning a first weight to the first probability score;
assigning a second weight to the second probability score; and
generating a weighted overall probability score based on the first probability score, the first weight, the second probability score, and the second weight.

15. A computing system comprising:
one or more processors; and
one or more computer-readable hardware storage devices having stored thereon computer-executable instructions that are structured such that, when executed by the one or more processors, the computer-executable instructions cause the computing system to perform at least:
obtain training data associated with historical deployment configurations of a container image via a container orchestration service;

extract a plurality of features for the historical deployment configurations of container images based on the training data;
select one or more collections of features among the plurality of features; and
for each of the one or more collections of features, train an anomaly detection model using machine learning, such that the anomaly detection model is configured to generate a probability score for a given dataset associated with one or more deployment configurations of the container image via the container orchestration service, indicating a probability that the one or more deployment configurations of the container image are anomalous when compared to a predetermined threshold that is indicative of whether the one or more deployment configurations of the container image are anomalous or not anomalous when compared to the historical deployment configurations,
wherein the training data associated with the historical deployment configurations of the container image includes first data associated with a first plurality of historical deployment configurations of a specific version of the container image and second data associated with a second plurality of historical deployment configurations of all versions of the container image,
wherein the computing system is further configured to:
train a first anomaly detection model based on the first data;
train a second anomaly detection model based on the second data;
generate a combined model configured to generate an overall consistency score,
wherein in response to receiving a dataset associated with the one or more deployment configurations of the container image,
the first anomaly detection model is configured to generate a first probability score, indicating a first probability that deployment configurations of a specific version of the container image is anomalous compared to the first plurality of historical deployment configurations, and
the second anomaly detection model is configured to generate a second probability score, indicating a second probability that deployment configurations of all versions of the container image are anomalous compared to the second plurality of historical deployment configurations, and the combined model is configured to generate a combined score based on the first probability score and the second probability score.

* * * * *